Figure 1:
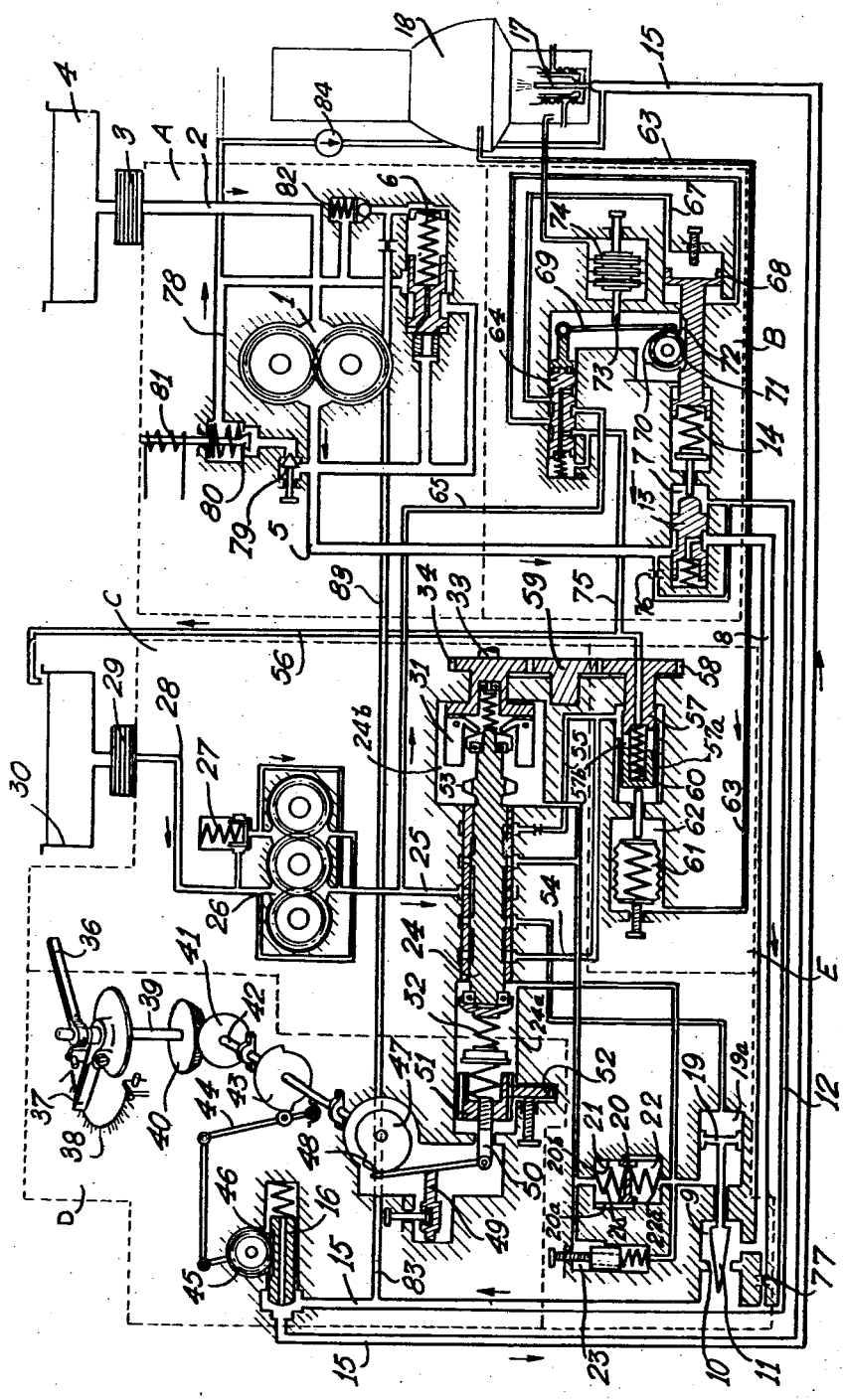

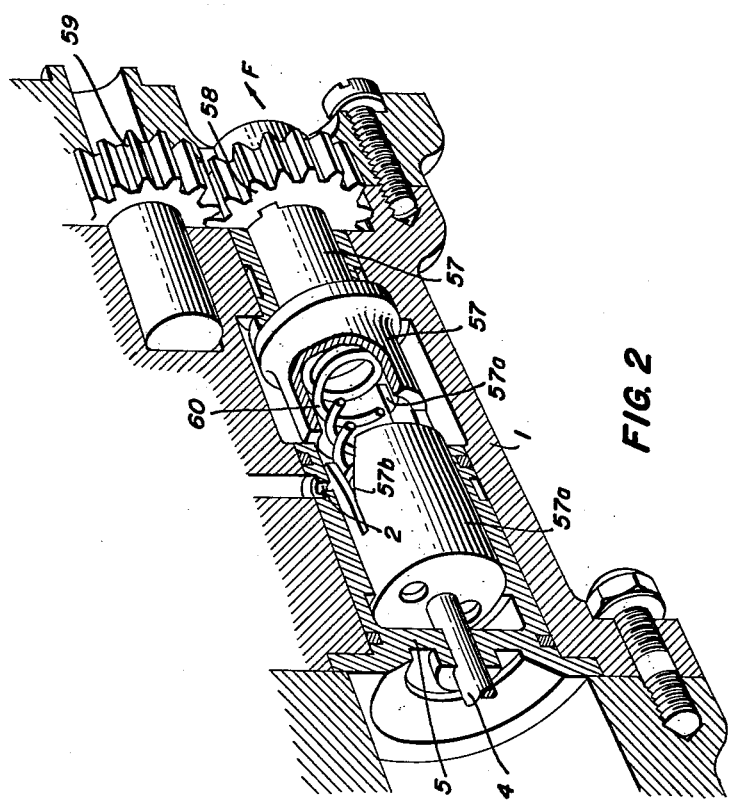

3,062,007
FUEL FEED SYSTEM FOR TURBOJET ENGINES
Joseph Szydlowski, Bordes, Basses-Pyrenees, France
Filed Feb. 19, 1958, Ser. No. 716,110
Claims priority, application France Feb. 20, 1957
6 Claims. (Cl. 60—39.28)

The present invention relates to improvements in or relating to the fuel feed systems of turbojet engines with the object of, on the one hand, delivering the output necessary for supplying the proper amount of fuel to the turbojet injectors, irrespective of the altitude and flying speed of the aircraft equipped therewith, and, on the other hand, obtaining a correct acceleration of the turbojet engine irrespective of the velocity at which the pilot may actuate the throttle control lever.

The main object of the present invention is to provide a turbojet fuel feed system comprising a fuel metering device responsive to the action of a hydraulic servo-controlled regulating device with temporary follow-up action which is connected to the fuel pump through the medium of an altitude-corrected fuel flow regulator and associated with a device adapted to make the turbojet acceleration independent of the velocity of operation of the throttle control lever or turbojet speed presetting lever.

The fuel metering device incorporates a variable-section orifice interposed in the pipe line connecting the fuel-flow regulator to the fuel injector, the cross-sectional area of this orifice being subordinate to the action exerted by a turbojet-driven governor on a hydraulic servo-control device with temporary follow-up action. This hydraulic servo-control device comprises preferably a hydraulic temporary follow-up action as described in the co-pending U.S. patent application Serial No. 714,798, filed on February 12, 1958, now Patent No. 3,002,502, by applicant and entitled "Regulating Device With Hydraulic Servo-Control and Follow-Up Action Means," and comprises a slide-valve distributor for the fluid under pressure utilized for actuating a servo-control piston adapted to modify the cross-sectional area of said orifice, the ends of said slide valve being responsive to the action of the centrifugal governor and of a turbojet speed presetting member, a follow-up acting piston being hydraulically connected to said slide-valve and adapted, under transient operating conditions, to subject said slide valve to a force opposite to the action of the preponderant one of said governor or said presetting device, and generated by the difference existing between the liquid pressures exerted by the corresponding displacement of said follow-up acting piston on either side thereof, other hydraulic means being provided for neutralizing or reducing to zero the aforesaid force under stabilized operating conditions.

The turbojet speed presetting device is advantageously of the type comprising a control lever solid with a cam acting upon the free end of a lever of the first order having its other end pivoted on a member adapted to slide against the resistance of a spring interposed between said member and one end of the slide valve, this assembly comprising spring adjusting means and other means for varying the position of the fulcrum of said lever without altering the position of the lever in one of the end positions of said control lever.

According to an advantageous form of embodiment, the fuel-flow regulator comprises a device for maintaining to a constant value the loss of pressure on either side of the variable-section orifice, this loss being adjusted in relation to the flying altitude and speed through the medium of a hydraulic servo-control device, so that at a predetermined turbojet speed the fuel metering device will adjust the variable-section orifice to a value independent of the total pressure existing at the inlet side of the supercharger. As a result, the device for regulating the fuel metering device, in principle, is not effective to correct a fuel-flow variation as a function of this total pressure.

The device whereby the acceleration is made independent of the velocity of operation of the throttle control lever consists of a variable-flow jet inserted in the delivery line of the distributor of the hydraulic servo-control device with temporary follow-up action associated with the fuel metering device, this variable flow jet being subjected to the supercharger delivery pressure. Said variable-flow jet advantageously comprises a cylindrical jet-holder in which a sleeve formed with a slot the shape of which varies according to a predetermined law is rotatably driven relative to a fluid inlet formed in the jet-holder, said sleeve having associated therewith means such as a diaphragm or bellows adapted to move said slot relative to the fluid inlet as a function of the delivery pressure of the supercharger. On the other hand, as the loss of pressure is constant, it is a relatively simple matter to calculate the shape of the variable-section orifice in order to obtain the highest possible acceleration.

Other features and advantages of this invention will appear as the following description proceeds with reference to the accompanying drawing illustrating by way of example a typical embodiment of the invention. The single FIGURE of the drawing shows the general arrangement of a turbojet fuel feed system constructed in accordance with the teachings of this invention.

This system comprises a fuel distributing unit A feeding fuel through the intermediary of a fuel-flow regulator B to a fuel metering device C of the hydraulic servo-control type with temporary follow-up action which is associated with a speed presetting device D and a variable-flow jet E for the hydraulic fluid which feeds said fuel metering device.

The fuel distributor unit A comprises a distributing pump 1 drawing through a pipe line 2 and a filter 3 the fuel contained in a tank 4 and delivering same through a pipe line 5. The delivery pressure of pump 1 is kept to a constant value in the known manner by a pilot relief-valve 6.

The pipe line 5 leads into the chamber 7 of the fuel-flow regulator B from which the fuel is fed through a pipe line 8 to the fuel metering device C controlled by a regulation device with hydraulic servo-control and follow-up action means described in the aforesaid U.S. patent application Serial No. 714,798. The metering member proper of the fuel metering device C comprises a chamber 9 formed with an orifice 10 the cross-sectional area of which may be varied by actuating a needle-valve 11 driven from the servo-control piston of the regulation device.

The pressure existing beyond or downstream the fuel metering device is transmitted through a pipe line 12 to one face of a differential piston 13 slidably mounted in the aforesaid chamber 7, the other face of this piston being responsive to the pressure existing before or upstream of the fuel metering device through the intermediary of lines 5 and 8. On the other hand, the piston 13, which defines a second variable section orifice in the fuel feed line, is constantly urged by a spring 14 adapted to balance the pressure differential between the upstream and downstream sides of the piston 13. When this pressure differential differs from the pressure exerted by the spring 14, the piston 13 is moved in chamber 7 and as a result the cross-sectional area available for the fuel through this chamber 7 is varied until the difference between the upstream and downstream pressures is restored to its initial value as balanced by the spring 14. From the outlet of the fuel metering device a pipe line 15 equipped with the main fuel cock 16 leads to the injector 17 of the turbojet engine 18.

The servo-controlled regulating system of the fuel metering device C comprises, as described and illustrated in the aforesaid U.S. patent application, a servo-control piston 19 mounted in a chamber 19a hydraulically coupled to a temporary follow-up acting piston 20 disposed between two opposed springs 21a, 22a of same force and dividing the relevant cylinder 20b into two chambers 21, 22 formed with longitudinal slots 20a. An adjustable compensation valve 23 with laminar flow is inserted in a circuit interconnecting the chambers 21 and 22. The chamber 21 and the face of the servo-control piston 19 which is not hydraulically connected to the follow-up acting piston 20 are fed with oil under pressure through the medium of the slide valve 24 of a distributor connected through a pipe line 25 to a servo-control pump 26 associated with an overload valve 27 and adapted to receive oil under pressure through a pipe line 28 and a filter 29 from an oil reservoir 30. The two chambers 21, 22 are respectively connected to two chambers 24a and 24b of said distributor which are disposed on either side of said slide-valve 24. Two delivery pipes 54 and 55 may be respectively connected through said slide-valve to chambers 19a and 21.

The slide valve 24 has one of its ends responsive to the centrifugal force acting upon the masses 31 of a centrifugal governor housed in chamber 24b and the other of its ends responsive to a spring 32 housed in chamber 24a and adjustable by means of the mechanical control system D. The masses 31 of the governor are driven from the member 33 driven in turn from the turbojet turbine and provided with teeth 34. The mechanical control system D is controllable by means of a hand lever 36 acting as a throttle control lever and associated with an index 37 movable in front of a speed scale 38. This hand lever is solid with a shaft 39 adapted through a train of bevel gears 40, 41 to drive another shaft 42 having keyed thereon two cams. One cam 43 drives through a rod linkage 44 a pinion 45 meshing with a rack 46 carried by the plug of the main fuel cock 16, and the other cam 47 actuates one end of a lever 48 engaging a vertically adjustable member 49 and having its other end pivoted on a screw-threaded rod 50 engaged by a tapped pinion 51, a hand-actuated wheel 52 being provided for adjusting the longitudinal position of the pinion on rod 50.

Under stabilized operating conditions the slide-valve 24 is positioned as illustrated. When, due to a variation of the engine speed inducing a modification in the action of the centrifugal masses 31 on said slide-valve or to a variation of the rotational speed to be imposed to the engine by acting on the hand lever 36 which modifies the action of spring 32 on said slide-valve, the slide-valve is moved, the liquid fed by the pump 26 is transmitted either to chamber 19a or to chamber 21, which generates a simultaneous displacement of the servo-control and follow-up acting pistons 19 and 20 in one direction or the other. The chambers 24a and 24b are respectively subjected to the pressures of the liquid in chambers 22 and 21, the direction of the resultant force applied to the slide-valve 24 being opposite to that of the initial displacement of said slide-valve. The follow-up action is maintained until said follow-up acting piston 20 returns to its position of equilibrium by the action of slots 20a and lameller compensation valve 23. The respective pressures in chamber 21, 22 and in chambers 24a, 24b are thus balanced at the end of this transient period. The slide-valve 24 is returned to the illustrated position and the servo-control piston 19 with its associated needle-valve 11 have been moved alone for adjusting the cross-sectional area of orifice 11 in accordance with the new operating conditions then stabilized. The vertical adjustment of member 49 allows to modify the position of the pivotal point of said lever 48 on said member 49 when said lever is vertical for one of the terminal positions of the mechanical control system D, so that the same system D may be used with fuel feed systems presenting small differences between each other and with turbojet engines manufactured in mass production.

To reduce frictional contacts the slide valve 24 of the distributor is rotatably driven from a small turbine 53 driven in turn by the oil in which the centrifugal masses 31 are immersed. The distributor on its delivery side comprises delivery pipe lines 54 and 55 which are both communicated to the line 56 leading into the reservoir 30 through a variable-flow rotary jet. Said jet comprises a part 57 rotably driven by the toothed wheel 58 driven in turn by the gear 59 meshing with the teeth 34 which part 57 is mechanically coupled to a part 57a having a slot 57b of variable section and slidably mounted in said part 57 is mechanically coupled to a part 57a having a slot this jet is adjusted against the pressure of the spring 60 by a bellows or diaphragm 61 disposed in a chamber 62 communicated through a pipe line 63 to the delivery pressure of the supercharger of the turbojet engine 18.

As a result the variable-flow jet has no action on the control of the fuel flow. It controls the rate of flow for the liquid under pressure which feeds the servo-controlled regulating system of the fuel metering device C as well as the velocity of operation of said system in relation to said delivery pressure, but only when said system is operative, so that the turbojet acceleration is independent of the velocity of operation of the throttle control lever.

The adjustment of the piston 13 of the fuel-flow regulator B and therefore of the differential fuel pressure through the variable-section orifice 10 is effected as a function of the total pressure existing at the inlet of the supercharger through the medium of a second hydraulic servo-action control device comprising a distributor having a slide-valve 64 and fed with oil under pressure from the servo-control pump 26 through the pipe line 65. The slide-valve 64 delivers through the pipe line 67 oil under pressure to a control piston 68 adapted to alter the tension of spring 14 and therefore to move the piston 13.

Further, the slide valve 64 is operatively connected through a lever 69 to the control piston 68; this lever 69 engages a cam 70 associated with a pinion 71 meshing with a rack 72 formed along the rod of the control piston 68. The lever 69 engages also a push-rod 73 controlled by aneroid bellows or diaphragms 74 responsive to the total pressure existing at the supercharger inlet. The return of the output regulator servo-control distributor takes place through a pipe line 75 opening into the line 56.

Such an adjustment of the differential fuel pressure through the variable-section orifice 10 in relation to the total pressure at the inlet of the supercharger corresponds to an adjustment in relation to the altitude and speed of flight.

By a suitable determination of the second hydraulic servo-action control device and of the bellows 61, said last relation may be selected so that at a predetermined rotational speed of the turbojet engine the fuel metering device sets the cross-sectional area of said variable-section orifice 10 to a value independent of said total pressure.

Jets 76 and 77 are mounted in by-pass lines branched off the fuel metering device and fuel-flow regulator, with the object of permitting the operation of the engine under starting and idling conditions by suppressing the actions of said fuel metering device and output regulator. A small pump 84 adapted to deliver fuel directly from the distributing pump 1 to the jet engine is provided for starting purposes. The fuel line 78 for feeding this small pump is provided with a manually adjustable small valve 79 adapted to create a leak of adjustable value from the main pipe line 5 in order to provide the desired fuel supply for the small pump 84. Another valve 80 responsive to the action of a time-lag electric relay 81 is provided for limiting the operation of the small pump to the period required for starting the engine.

A safety valve 82 mounted in a pipe line 83 leading to the pipe line 15 upstream of the main cock 16 permits of forcing the fuel back to the suction side of distributing pump 1 in order to avoid any dangerous overload in case this pump 1 had a zero output subsequent to closing the main cock 16.

Under stabilized operating conditions, the fuel metering device C and the fuel-flow regulator B are positioned as illustrated in the figure. When the pilot acts on the hand lever 36 for presetting a new rotational speed to be imposed to the engine or when the actual rotational speed of said engine varies, as explained hereinbefore a transient action of said fuel metering device C and of the fuel-flow regulator B modifies the cross-sectional area of orifice 10 as well as the flow of fuel through chamber 7 in order to finally obtain a fuel flow and a differential pressure through said orifice corresponding to the new operating conditions when stabilized. Similarly in relation to a variation of altitude the bellows 61 and 74 modify the fuel flow through the variable-flow jet 57 and the pipe line 5. The liquid used in the servo-control devices is fed by pump 26 and is different from the fuel fed by pump 1.

Of course, various modifications and alterations may be brought to the embodiment shown and described herein, without departing from the scope of the invention as set forth in the appended claims.

What I claim is:

1. A fuel feed system for a turbojet engine having a supercharger, comprising, in combination, a fuel feed pump, a fuel pipe line interconnecting said pump and the injectors of the turbojet engine; a speed responsive fuel metering device having a fuel metering valve inserted in said line for defining a first variable-section orifice therein, a throttle control lever means, and means sensitive to the rotational speed of said engine and connected to said throttle control lever means and to said valve for varying the cross-section of said first variable-section orifice and therefore the fuel flow therethrough in relation to the engine rotational speed; a fuel-flow regulator for adjusting at a constant value the differential fuel pressure through said valve, said regulator having a differential piston inserted in said line upstream of said valve for defining a second variable-section orifice therein, the faces of said piston being respectively connected to the upstream and downstream sides of said valve, a spring acting on the face of said piston which is connected to the upstream side of said valve and balancing said constant differential fuel pressure across said valve, and means sensitive to the total pressure at the inlet of the supercharger and connected to said differential piston for varying the cross-section of said second variable-section orifice and therefore the fuel flow therethrough in relation to said total pressure without action on the cross-section of the first variable-section orifice; and means sensitive to the delivery pressure of said supercharger and connected to the means sensitive to the engine rotational speed for controlling the velocity of operation of said last means in relation to said delivery pressure so that the turbojet acceleration is independent from the velocity of operation of the throttle control lever means.

2. In a fuel feed system for a turbojet engine having a supercharger and of the type including a fuel feed line for the turbojet engine and a fuel metering device having a distributing slide-valve with inlet and delivery sides for feeding with a liquid under pressure other than the fuel, on the one hand, a servo-control piston mechanically connected to a fuel metering valve inserted in said line and, on the other hand, a temporary follow-up acting piston hydraulically connected to said servo-control piston, according as the prevailing number of revolutions of the engine is lower or higher than the number of revolutions to be adjusted by a throttle control lever means, the two faces of said temporary follow-up acting piston being interconnected through an adjustable restricted valve providing a laminar flow; the improvement which comprises a fuel-flow regulator for adjusting at a constant value the differential fuel pressure through the fuel metering valve of the fuel metering device, said regulator having a differential piston inserted in the fuel feed line for the turbojet engine upstream of said fuel metering valve for defining a variable-section orifice therein, the faces of said piston being respectively connected to the upstream and downstream sides of said fuel metering valve, a spring acting on the face of said piston which is connected to the upstream side of said valve and balancing said constant differential fuel pressure across said valve, means sensitive to the total pressure at the inlet of the supercharger and connected to said differential piston for varying the cross-section of said variable-section orifice and therefore the fuel flow therethrough in relation to said total pressure without action on the fuel metering valve of the fuel metering device; and means sensitive to the delivery pressure of said supercharger and connected to the delivery side of the distributing slide-valve of the fuel metering device for controlling the velocity of operation of said distributing slide-valve in relation to said delivery pressure so that the turbojet acceleration is independent from the velocity of operation of the throttle control lever means.

3. A turbojet engine fuel feed system according to claim 2, wherein the throttle control lever means comprises a compression spring bearing on the slide-valve of the fuel metering device, a manually operable control assembly, a rotary cam controlled by said assembly, a lever one end of which is in contacting engagement with said cam, a slidable assembly on which the other end of said lever is pivotally mounted and which bears on the compression spring, means for adjusting the initial compression of said spring under the action of said slidable assembly, and means in contacting engagement with said lever intermediate the two ends thereof and displaceable parallelly to said lever when positioned for one of the terminal positions of said manually operable control assembly for modifying the position of its contacting engagement with said lever so that the same throttle control lever means may be used with fuel feed systems presenting small differences between each other and with turbojet engines manufactured in mass production.

4. A turbojet engine fuel feed system according to claim 2, wherein the means sensitive to the total pressure at the inlet of the supercharge comprises a source of liquid under pressure other than the fuel, a pump connected to said source, a distributing slide-valve connected to said pump, a control piston hydraulically connected to said slide-valve, a spring interposed between said control piston and the other face of the differential piston, a lever pivotally mounted on one end of said slide-valve, bellows responsive to the total pressure existing at the supercharger inlet, a push rod connected to said bellows and engaging said lever, and mechanical means engaging said lever and said control piston in order to apply to said slide-valve an action related to the pressure exerted by said control piston on said spring, whereby the passage defined in the fuel feed line by the fuel metering valve of the fuel metering device remains constant when said total pressure varies so that at high altitudes while the fuel flow is reduced through the variable-section orifice the value of said passage is maintained.

5. A turbojet engine fuel feed system according to claim 2, wherein the means sensitive to the delivery pressure of the supercharger comprises a variable-flow jet inserted in the delivery side of the distributing slide-valve of the fuel metering device and slidably mounted, bellows responsive to the delivery pressure of the supercharger, a push rod connected to said bellows and engaging one end of said slidable variable-flow jet, and a compression spring engaging the other end of said slidable variable-flow jet.

6. In a fuel feed system for a turbojet engine having a supercharger and of the type including a fuel feed line for the turbojet engine and a fuel metering device having a distributing slide-valve with inlet and delivery sides for feeding with a liquid under pressure other than the fuel, on the one hand, a servo-control piston mechanically connected to a fuel metering valve inserted in said line and, on the other hand, a temporary follow-up acting piston hydraulically connected to said servo-control piston, according as the prevailing number of revolutions of the engine is lower or higher than the number of revolutions to be adjusted by a throttle control lever means, the two faces of said temporary follow-up acting piston being interconnected through an adjustable restricted valve providing a laminar flow; the improvement which comprises a fuel-flow regulator for adjusting at a constant value the differential fuel pressure through the fuel metering valve of the fuel metering device, said regulator having a differential piston inserted in the fuel feed line for the turbojet engine upstream of said fuel metering valve for defining a variable-section orifice therein, the faces of said piston being respectively connected to the upstream and downstream sides of said valve, a spring acting on the face of said piston which is connected to the upstream side of said valve and balancing said constant differential fuel pressure across said valve, a source of liquid under pressure other than the fuel, a pump connected to said source, a second distributing slide-valve connected to said pump, a control piston hydraulically connected to said second slide-valve, a second spring interposed between said control piston and the other face of the differential piston, a lever pivotally mounted on one end of said second slide-valve, bellows responsive to the total pressure existing at the supercharger inlet, a push rod connected to said bellows and engaging said lever, and mechanical means engaging said lever and said control piston in order to apply to said second slide-valve an action related to the pressure exerted by said control piston on said second spring for varying the cross-section of said variable-section orifice and therefore the fuel flow therethrough in relation to said total pressure without action on said fuel metering valve, a variable-flow jet inserted in the delivery side of the distributing slide-valve of the fuel metering device and slidably mounted, second bellows responsive to the delivery pressure of the supercharger, a second push rod connected to said second bellows and engaging one end of said slidable variable-flow jet, and a compression spring engaging the other end of said slidable variable-flow jet, whereby said variable-flow jet controls the velocity of operation of the distributing slide-valve of the fuel metering device in relation to said delivery pressure so that the turbojet acceleration is independent from the velocity of operation of the throttle control lever means.

References Cited in the file of this patent

UNITED STATES PATENTS

| | | |
|---|---|---|
| 2,644,513 | Mock | July 7, 1953 |
| 2,647,493 | Whitehead et al. | Aug. 4, 1953 |
| 2,673,556 | Reggio | Mar. 30, 1954 |
| 2,708,826 | Torrell | May 24, 1955 |
| 2,756,725 | Parker | July 31, 1956 |
| 2,759,549 | Best | Aug. 21, 1956 |
| 2,837,894 | Kind | June 10, 1958 |
| 2,856,754 | Torrell | Oct. 21, 1958 |
| 2,867,269 | Bayer | Jan. 6, 1959 |

FOREIGN PATENTS

| | | |
|---|---|---|
| 646,780 | Great Britain | Nov. 29, 1950 |